United States Patent

Sexton, Jr.

[15] 3,686,517

[45] Aug. 22, 1972

[54] TEMPERATURE COMPENSATION MEANS FOR ELECTRONIC CIRCUIT

[72] Inventor: Charles W. Sexton, Jr., Virginia Beach, Va.

[73] Assignee: General Electric Company

[22] Filed: Sept. 2, 1971

[21] Appl. No.: 177,254

[52] U.S. Cl. ....................307/310, 307/254, 330/23, 323/69

[51] Int. Cl. ............................................H03k 17/00

[58] Field of Search .............307/310; 328/3; 330/23; 331/70; 323/68, 69; 317/235 Q; 315/50, 7 Q, 112

[56] References Cited

UNITED STATES PATENTS

| | | | |
|---|---|---|---|
| 3,028,473 | 4/1962 | Dyer et al. | 330/23 |
| 3,409,757 | 11/1968 | McVey | 307/310 X |
| 3,486,080 | 12/1969 | Tillmann | 323/69 |

*Primary Examiner*—Donald D. Forrer
*Assistant Examiner*—B. P. Davis
*Attorney*—W. J. Shanley, Stanley C. Corwin, F. W. Powers, Frank L. Neuhauser, Oscar B. Waddell and Joseph B. Forman

[57] ABSTRACT

Temperature compensation means including a pair of series-connected thermisters which provide an offset voltage for an output transistor. A first thermistor is placed in close thermal relationship with a circuit element which rapidly attains its normal operating temperature, while a second thermistor is located in the general environment of the transistor and associated circuitry such that its temperature is substantially tracks the temperature of the transistor. The combined characteristics of the two thermistors so disposed produce a voltage-temperature characteristic which substantially parallels that of the voltage drop across a junction of the output transistor.

8 Claims, 5 Drawing Figures

TEMPERATURE COMPENSATION MEANS FOR ELECTRONIC CIRCUIT

BACKGROUND OF THE INVENTION

The present invention relates to thermal compensation means and, more particularly, to means for compensating for thermally-variable characteristics of elements in a television receiver circuit.

In constructing a circuit including electronic devices, it has long been recognized that the characteristics of various circuit elements may vary with temperature. Most circuits are therefore designed to operate at some anticipated ambient temperature. It is often anticipated that circuit elements will attain a predetermined ambient temperature during their normal operation, and that a relatively short warmup time will be involved. In some instances, however, these assumptions are not strictly correct. In particular, it has been found that the voltage drops across junctions within transistors vary substantially with temperature.

The most important junction voltage drop, from a standpoint of controlling the transistor, is the base-to-emitter voltage drop of $V_{be}$. Thermally-induced variations are particularly acute for transistors in the vertical output stage of a television receiver since they operate in a class B or "off-on" mode. The transistors must thus operate over both the linear and non-linear portion of their characteristic curves, making fixed voltage compensation impossible. Moreover, such transistors are often coupled directly to the system which they operate, with no feedback loop to compensate for improper voltage or current levels. Unfortunately, slight variations in the characteristics of such an output transistor will produce aberrations which are readily apparent to a viewer. Such aberrations normally are manifested in two forms: a compression of the upper portion of a displayed image, and a lengthening or a shortening of the total image height.

While circuit parameters may easily be adjusted to allow for a fixed aberration, when such aberrations are of a transitory nature and arise due to thermal fluctuations or because of a prolonged warmup time, continued readjustment and manual compensation will still be necessary.

It will therefore be understood that it would be highly desirable to provide a television receiver with means to compensate for fluctuations in circuit element characteristics due to thermal variations.

It is therefore an object of the present invention to provide thermal compensation means in a television receiver circuit.

It is a further object of this invention to provide means for compensating for thermally-induced variations in the characteristics of an electronic device.

It is still another object of this invention to provide thermal compensation means for maintaining a substantially constant vertical sweep signal characteristic in a television receiver.

SUMMARY OF THE INVENTION

Briefly stated, in accordance with one aspect of the invention, the foregoing objects are achieved by coupling a pair of series-connected temperature-variable resistors, or thermistors, to an electronic device. A first thermistor is disposed in intimate thermal contact with a circuit element which attains its normal operating temperature in a relatively short period of time. The second thermistor, however, is disposed in generally the same location as the circuitry associated with the electronic device, so that its temperature closely parallels that of the circuit and so of the device. The combined resistance of the two series-connected thermistors closely parallels the base-emitter voltage drop of an output transistor for a broad range of temperatures, providing a temperature-variable offset or compensating voltage which biases the output transistor in a substantially constant fashion despite variations in temperature due to warmup, or changes in the surrounding ambient temperature.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
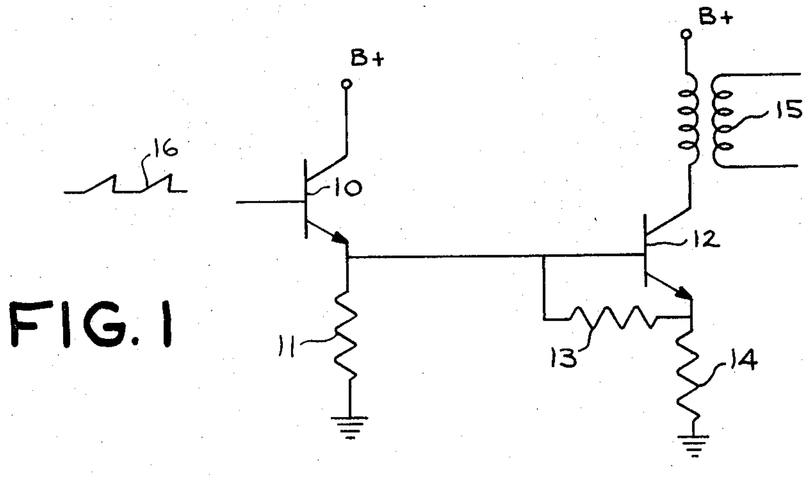
FIG. 1 is a schematic diagram of an electrical circuit including elements susceptible of variation with changes in temperature.

Referring now to FIG. 1, a portion of a typical vertical deflection drive circuit is disclosed, including a first transistor 10 whose collector terminal is coupled to a source of bias potential (not shown), and the emitter of which is connected to ground by means of an emitter-follower resistor 11. A second, output transistor 12 is coupled to the first transistor 10 in a typical emitter-follower configuration. A biasing resistor 13 couples the base of transistor 12 to the emitter thereof, while resistor 14 connects the emitter terminal to ground. The collector terminal of output transistor 12 may advantageously be coupled to a driven element, herein shown as the primary winding of a vertical deflection transformer 15 which is adapted to apply current to the electromagnetic deflection winding of a television receiver. In operation, a periodic signal 16 having a substantially linear rate of rise, and often referred to as a "sawtooth" voltage, is applied to the base terminal of transistor 10. In practice, due to the characteristics of the deflection system it is often desirable that the initial slope of the sawtooth signal 16 be somewhat less than the terminal portion so as to effect a concave or parabolic, rather than a linear, rise. Under ideal circumstances a corresponding waveform will be produced at the emitter terminal of drive transistor 10, eventuating in a similarly-formed sawtooth current being drawn through output transistor 12.

Figure 2:
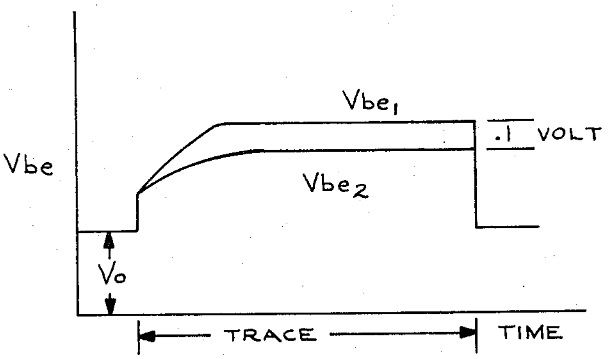
FIG. 2 is a plot of the base-to-emitter voltage drop of a typical output transistor.

In practice, however, it has been found that the base-to-emitter voltage of output transistor 12 varies significantly with temperature. In particular, as the temperature of transistor 12 rises, due to current flowing therethrough and also because of a rise in the temperature of the nearby circuitry, the base-to-emitter voltage decreases in a non-linear fashion. The net effect of this change is graphically illustrated by FIG. 2. The curve therein represents the base-to-emitter voltage $V_{be_1}$ of output transistor 12 as a typical deflection waveform is impressed upon the base terminal thereof. When driver transistor 10 is constrained to a relatively low rate of conduction, a minimum voltage $V_o$ is produced. As a trace period begins, however, transistor 10 conducts harder and the voltage applied to the base of output transistor 12 increases. Some of the applied voltage appears across the base-emitter junction of transistor 12, while the rest appears across the emitter-resistor 14. $V_{be_1}$ represents the base-emitter voltage characteristic for output transistor 12 when cold, that is, at the ambient temperature of the receiver surroundings. After the transistor has attained its normal operating temperature, a period of time which may be 10 minutes or more, the base-emitter voltage characteristic is lowered and changes shape somewhat as illustrated by curve $V_{be_2}$. At the same time, the signal impressed upon the base terminal of output transistor 12 remains substantially constant. The net effect is that, given the same base signal voltage, output transistor 12 conducts less when "cold" since a higher signal voltage level is required at the base to offset the increased base-to-emitter voltage drop. However, if the signal voltage level of drive transistor 10 is permanently increased, when output transistor 12 eventually attains its normal operating temperature the reduced base-emitter voltage $V_{be_2}$ will cause current drawn through by the output transistor to increase beyond that which is necessary for proper operation of the system.

In the example illustrated, a difference in temperature of approximately 45° produces a change in base-to-emitter voltage of substantially 0.1 volt. It will be seen from FIG. 2 that for the latter portion of the trace period, the differential between "cold" voltage $V_{be_1}$ and "warm" voltage $V_{be_2}$ is substantially constant. This corresponds to a fixed drop in output current, which produces less deflection than is required and so effects a shortened image upon the screen of the receiver. For the initial portion of a trace period, however, base-emitter voltage curves $V_{be_1}$ and $V_{be_2}$ are not parallel but diverge. Current rise through the output transistor 12 then changes in a non-linear fashion with temperature to produce a diminished rate of deflection, and thus a compression of the displayed image, for the initial part of the trace. This effect manifests itself as a contraction or "squashing" of the upper portion of a displayed image.

Figure 3:
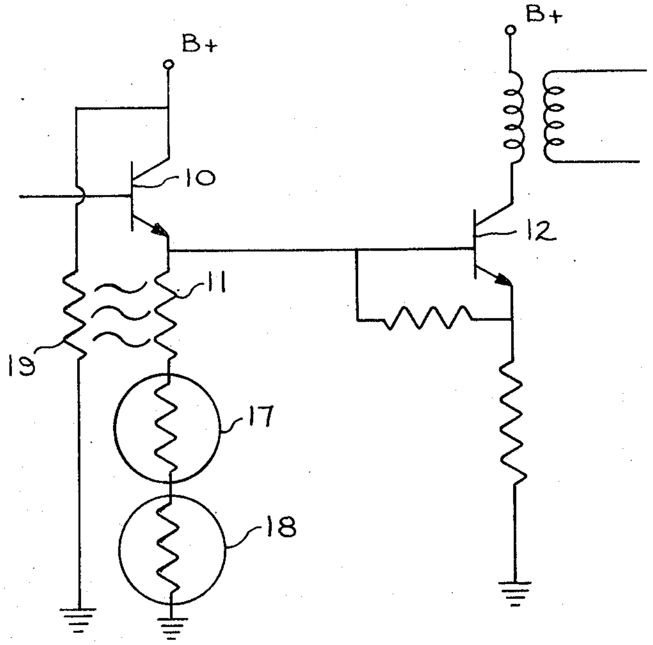
FIG. 3 is a schematic diagram of the circuit of FIG. 1 utilizing principles of the present invention.

FIG. 3 shows a modified version of the circuit of FIG. 1, incorporating temperature compensation means constructed in accordance with the present invention. It will be seen that a pair of resistors 17 and 18 having negative thermal resistance characteristics, hereinafter referred to as thermistors, have been connected in series with emitter-follower resistor 11. Thermistors 17 and 18 thus provide temperature-variable biasing voltage at the base terminal of output transistor 12. It may now be desirable to utilize a somewhat smaller emitter-follower resistor 11 to allow for the additional resistance introduced by thermistors 17 and 18.

The mere use of thermistors for thermal compensation in an electrical circuit is, of course, not new. However, the voltage-temperature characteristic of most such devices is logarithmic, and quite dissimilar from the base-emitter voltage vs. temperature characteristic of a transistor. Thus the mere provision of a thermistor to produce a temperature-varying offset voltage still cannot achieve an offset voltage which will produce consistent deflection signal characteristics in the presence of varying temperatures. However, by disposing the thermistors in the manner described below, a suitable temperature-varying offset voltage can be obtained.

One of the thermistors, herein designated as thermistor 17, is mounted in close thermal relationship with a power resistor 19. In one successfully constructed circuit resistor 19 served as a load resistor for a horizontal buffer state; however, any suitable resistor which provides the requisite rapid warmup for thermistor 17 will do. The temperature of resistor 19, effected by $I^2R$ heating, stabilizes in a relatively short time. In one circuit tested this time was approximately 5 minutes. The other thermistor, herein designated 18, is disposed in the vicinity of the other elements of the circuit such that the temperature of this thermistor closely approximates that of the circuit elements, especially output transistor 12. It will be appreciated, of course, that the positions of thermistors 17 and 18 may be interchanged, and that they may be connected in any sequence with emitter follower resistor 11 since it is the net voltage drop produced across the series combination of the emitter follower resistor and the thermistors which is significant. In one circuit constructed in accordance with the teachings of the present invention the circuit substantially attained its maximum operating temperature in approximately 10 minutes.

It should be understood that the specific times required for each of the thermistors 17 and 18 to attain its maximum temperature are dependent upon the characteristics of the circuit in which they are placed and form no part of the present invention. Rather, it is the relationship between the warm-up times of the thermistors that results in the production of the desired overall resistive characteristic. Since thermistor 17 is disposed in an environment which heats up substantially faster than that of thermistor 18, the resistance thereof changes in a much more rapid fashion. The resistance of thermistor 18, on the other hand, continues to change over a longer period of time albeit at a slower rate. The net effect is to produce a composite resistance which changes rapidly for a first period of time and then relatively slowly over a second, longer period.

Figure 4:
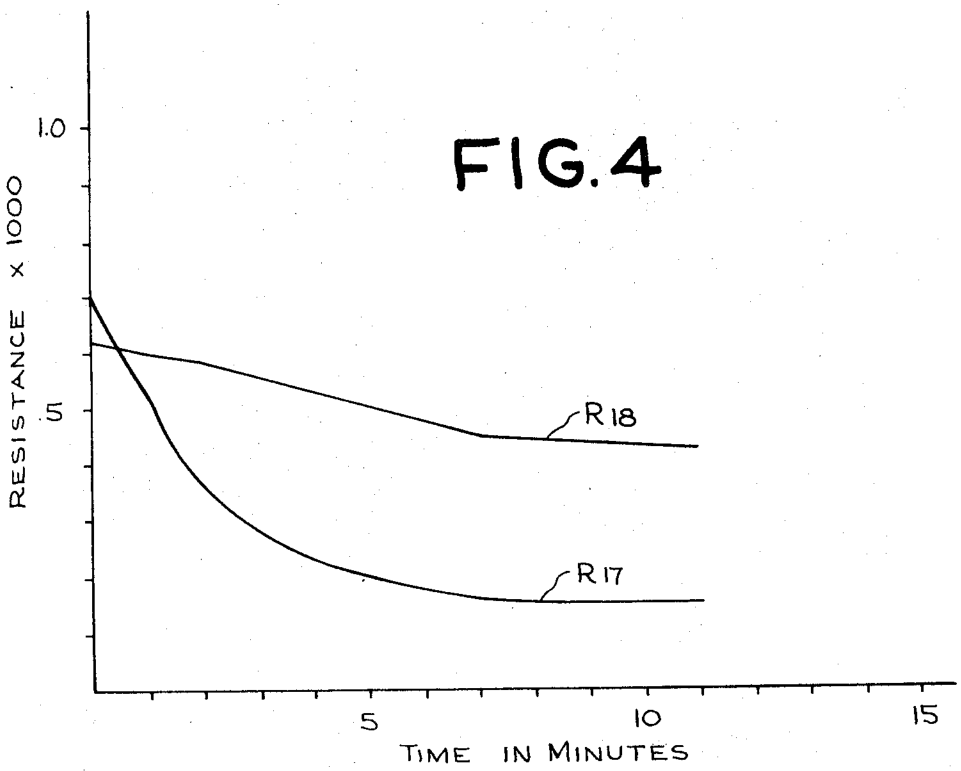
FIG. 4 is a plot of the resistance of certain circuit elements as a function of temperature.

FIG. 4 shows the change in resistive values $R_{17}$ and $R_{18}$ of thermistors 17 and 18 respectively as a function of time, starting at the instant when the circuit of FIG. 3 is energized. It will be seen that substantially all of the change in the resistance of thermistor 17 takes place during the first 5 minutes of circuit operation, this being atrributable to the relatively rapid temperature stabilization of the power resistor 19 with which thermistor 17 is associated. Thermistor 18, on the other hand, experiences a much more gradual resistance change which extends over a longer period of time. The resistive value of thermistor 18 stabilizes in approximately the same amount of time as it takes for the overall drive circuit, and thus output transistor 12, to attain its normal operating temperature.

Figure 5:
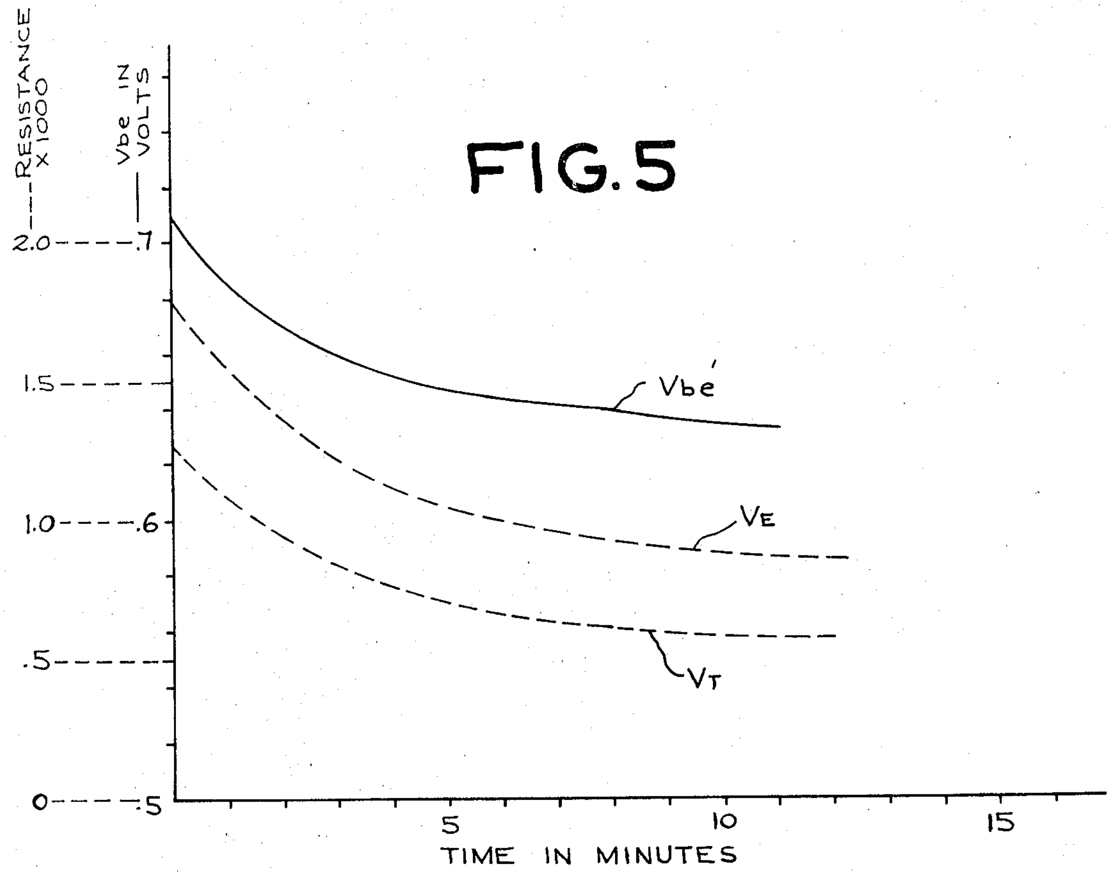
FIG. 5 is a plot showing temperature-related voltage drops across various portions of the circuit of FIG. 3.

The resistance across the series combination of thermistors 17 and 18 as a function of warm-up time, and thus of circuit temperature, is illustrated by curve $V_T$ in FIG. 5. Since for a given current flow the voltage drop across the series-connected resistors is directly proportional to the resistance thereof, the curve $V_T$ has a shape which represents the voltage drop across thermistors 17 and 18. Curve $V_{be_1}$ represents the base-emitter voltage drop across transistor 12 during the same time period.

Curve $V_E$ is a plot of empirical resistor values which were generated by manually varying the value of a resistance placed in series with emitter resistor 11 so as to maintain the proper size and linearity of a displayed image while the receiver was warming up to its normal operating temperature. While a representative collector current of 40 milliamps was utilized for generating curve $V_{be_1}$, substantial changes in collector current produce essentially the same base-emitter voltage curve. It will now be seen from FIG. 5 that the voltage drop across thermistors 17 and 18, represented by curve $V_T$, is substantially parallel to the base-emitter voltage drop $V_{be_1}$ during the warm-up time of the receiver.

More importantly, the series combination of thermistors 17 and 18 have almost exactly the same thermal response as that exhibited by the "ideal," empirical characteristic $V_E$. This, of course, would not be the case were thermistors 17 and 18 disposed so as to reflect only the circuit temperature as experienced by output transistor 12. Similarly, should thermistors 17 and 18 be disposed near an element whose temperature stabilizes in a relatively short period of time, such as power resistor 19, curves $V_T$ and $V_{be_1}$ would cease to be substantially parallel after 5 to 6 minutes had elapsed and would diverge. Such divergence, indicating a departure from the necessary compensating characteristics, would effect size and/or linearity aberrations in the displayed image.

While it will be understood that values of the various circuit components may be varied to suit a particular application, the following values of circuit components are given by way of example:

| | |
|---|---|
| Resistors: | |
| 11 | 1 kilohm |
| 13 | 220 ohms |
| 14 | 44 ohms |
| 19 | 2.2 kilohms |
| Transistors | |
| 10 | General Electric Type 16E |
| 12 | Motorola MJE 340 |
| Thermistors 17 and 18 | Carborundum high negative temperature coefficient, 650 ohms at 25°C. |

It will now be apparent to those skilled in the art that the present invention involves thermal compensation means whereby a pair of thermistors having the usual thermally-related resistive characteristics may be incorporated in a circuit for providing a compensating or offset voltage for operating an electronic device, which closely parallels thermal characteristics of the device itself. Further, it will be appreciated that this has been accomplished through the use of standard, commercially available thermistor units, with no modification thereof.

As will be evident from the foregoing description, certain aspects of the invention are not limited to the particular details of the examples illustrated, and it is therefore contemplated that other modifications of applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. In an electrical circuit including a device whose electrical characteristics vary with temperature, compensating means comprising:

first means operatively associated with the electrical circuit and adapted to attain a maximum operating temperature in a first period of time;

first temperature-variable resistance means disposed in thermal contact with said first means; and, second temperature-variable resistance means disposed in substantially close proximity to the electrical circuit for attaining a maximum operating temperature in a second period of time which is substantially longer than said first period of time;

said first and said second temperature-variable resistance means being coupled to the device for varying the bias thereon.

2. Compensating means as defined in claim 1, wherein said first and said second temperature-variable resistance means have a negative thermal coefficient of resistance.

3. Compensating means as defined in claim 2, wherein said first and second temperature-variable resistance means are coupled between a control terminal of the device and a point of reference potential.

4. Means for providing a thermally-varying voltage to an electronic device to compensate for a thermally-variable characteristic of the device, comprising:

first temperature-variable resistance means;

resistance means adapted to be energized simultaneously with the electronic device and disposed in thermal contact with said first temperature-variable resistance means for causing said first temperature-variable resistance means to attain a predetermined temperature in a predetermined period of time; and, second temperature-variable resistance means disposed in an environment whose temperature varies in approximately the same manner as that of the electronic device, said second temperature-variable resistance means being coupled in electrical series relationship with said first temperature-variable resistance means;

the series circuit comprising said first and said second temperature-variable resistance means being coupled to said electronic device.

5. The invention defined in claim 4, wherein said first and said second temperature-variable resistance means are thermistors.

6. Means for providing a thermally-varying voltage for offsetting a thermally-varying characteristic of a transistor, comprising:

resistor means adapted to produce thermal energy upon the application of electrical energy thereto;

first temperature-variable resistance means disposed in thermal contact with said resistor means;

second temperature-variable resistance means disposed in a location whose temperature varies in approximately the same manner as that of the transistor, said second temperature-variable resistance means being connected in electrical series relationship with said first temperature-variable resistance means; and means for coupling said series-connected temperature-variable resistance means to the transistor.

7. The invention defined in claim 6, wherein said first and said second temperature-variable resistance means have a negative thermal coefficient of resistance.

8. The invention defined in claim 7, wherein said series-connected temperature-variable resistance means are coupled between the base terminal of said transistor and a point of reference potential.

* * * * *